Sept. 5, 1933.　　　　R. H. MAYO　　　1,925,768
MEANS FOR LAUNCHING AIRCRAFT
Filed March 16, 1933　　　4 Sheets-Sheet 1

Sept. 5, 1933.   R. H. MAYO   1,925,768
MEANS FOR LAUNCHING AIRCRAFT
Filed March 16, 1933   4 Sheets-Sheet 2
*Fig. 4.*
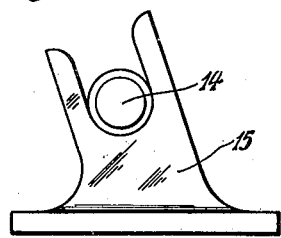
*Fig. 5.*
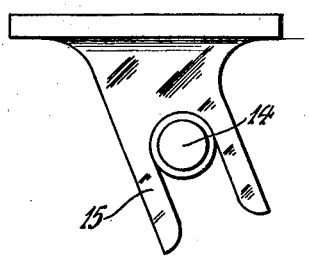
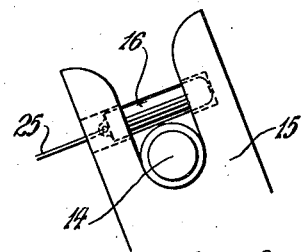
*Fig. 6.*
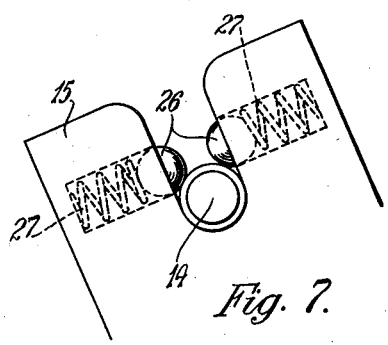
*Fig. 7.*
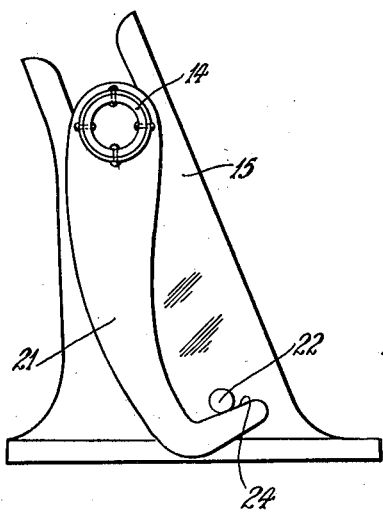
*Fig. 8.*
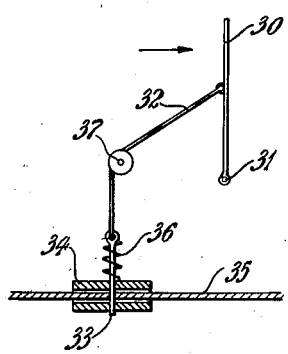
*Fig. 9.*
Robert Hobart Mayo
Inventor
By Sept. 5, 1933.  R. H. MAYO  1,925,768
MEANS FOR LAUNCHING AIRCRAFT
Filed March 16, 1933   4 Sheets-Sheet 4

Robert Hobart Mayo
Inventor
By

Patented Sept. 5, 1933

1,925,768

UNITED STATES PATENT OFFICE 1,925,768

MEANS FOR LAUNCHING AIRCRAFT

Robert Hobart Mayo, London, England

Application March 16, 1933, Serial No. 661,157, and in Great Britain April 26, 1932

37 Claims. (Cl. 244—2)

This invention relates to means for launching aircraft, the particular purpose of the invention being to provide means enabling an aircraft to be launched at such speed and at such attitude as to ensure the safe continuation of its flight, without it first having to attain the necessary minimum flying speed by taxying over land or water or by being catapulted into the air. The invention is more especially applicable to the launching of aircraft of high wing loading and high minimum flying speed, but may be applied to any class of aircraft, or to the launching of an aircraft at a considerable distance from its base thus increasing its effective range.

The method and means employed comprise the mounting of the aircraft to be launched on and above another aircraft in such a manner as to form a composite aircraft which can be safely taken off, flown and manœuvred as a single composite aircraft, with the wings of each component aircraft lifting during flight, the components being rigidly connected together and having means operable from either or both components for disengaging the said connections during flight to permit of separation of the two components, and means for increasing the angle of incidence and/or lift coefficient of the wings of the upper component before such disengagement. The composite aircraft is taken off from land or water or the deck of a ship as the case may be, and when it has reached a speed in excess of the minimum flying speed of its upper component (i. e. the aircraft to be launched) this component can be detached from the lower component and launched in flight on its own account, leaving the lower component free to fly back to its base. It will be understood that the word "aircraft" as used herein includes land aeroplanes, seaplanes, flying boats and aircraft of amphibian type.

It has already been proposed to provide supplementary power units for assisting in accelerating an aircraft during its take-off, and to drop such units by the aid of parachutes or by fitting them with supporting planes when the take-off and start of the flight have been satisfactorily accomplished.

An aircraft of high wing loading and high minimum flying speed, even though it be accelerated by supplementary power units, may, however, require conditions so favourable as to be rarely if ever attainable in practice, and must if it is to be taken off directly from land or water be of robust and heavy construction so as to withstand the heavy stresses arising from high taking off speed.

It has also been proposed to facilitate the starting of an aircraft by placing such aircraft on top of another aircraft in order to add to the propulsive force of the aircraft to be started by providing an additional force of acceleration for the latter. This proposal is distinguished from the present invention in that it provides neither positive rigid connections between the two aircraft which are disengageable at will to permit them to separate and continue to fly independently, nor means for increasing the angle of incidence and/or lift coefficient of the wings of the upper component relatively to the lower component prior to separation. It has further been proposed to facilitate the starting of an aircraft by suspending it below another aircraft by connections which can be released by the crew of one or other of the aircraft.

It has been proposed in the case of aircraft of the type having supporting vanes rotating about a substantially vertical axis to facilitate the "take-off" of such aircraft from moving objects by utilizing the motion of the air due to the travel of the moving object to set the vanes revolving initially and by tilting a platform on which the aircraft is supported so that the air current is forced through the disc area swept out by the vanes. This proposal is, however, concerned only with starting up rotation of the vanes of an aircraft of the rotating vane type and is also essentially different from the present invention in that the aircraft is merely carried on a platform on a moving object (such as the gun turret of a ship) and does not form part of a composite aircraft of which the two components are rigidly secured together.

It has further been proposed to mount an auxiliary aircraft on a mother aircraft for release and independent flight, but the present invention is distinguished from this prior proposal in that the latter provides only for the auxiliary aircraft to be carried at a fixed attitude in relation to the mother aircraft, no means being provided for increasing the lift coefficient of the wings of the auxiliary aircraft prior to release, and thus, for the reasons explained below, does not offer a satisfactory solution to the problem of launching a heavily loaded aircraft.

According to the present invention, the whole problem of launching an aircraft is solved by forming a composite aircraft of which the aircraft to be launched is the upper component, such that the composite aircraft can be safely taken off (or otherwise launched), flown, manœuvred and if necessary landed as a single composite aircraft, and such that the upper component can be safely detached from the lower at any desired time after the composite aircraft has reached or exceeded the minimum flying speed of the upper component without risk of fouling, the angle of incidence and/or lift coefficient of the wings of the upper component having first been increased to the extent necessary to ensure continued vertical separation of the two components until they are safely parted.

It is an essential feature of the invention that the two components of the composite aircraft are rigidly locked together during the take off and flight of the composite aircraft and remain so locked together until the moment when it is desired to detach the upper component from the lower and launch it in flight on its own account. Without this feature any combination of aircraft flying together will be essentially dangerous, because variations in attitude or accelerations due to atmospheric disturbance or jolting while taxying would be liable to cause detachment of one aircraft from the other under conditions which would cause the risk of immediate collision or fouling between the two. According to the present invention, however, the two components of the composite aircraft are and remain securely locked together unless and until positive action to permit detachment of the upper component from the lower is taken by the pilot or other member of the crew of either or both of the components. This being so, the composite aircraft can be taken off, flown and manœuvred as a single composite aircraft, and if any cause such as engine failure or unfavourable atmospheric conditions should intervene to render detachment of the upper component from the lower dangerous or undesirable the composite aircraft can be safely landed without such detachment taking place at all.

It is well known that a substantial improvement in the performance of aircraft, particularly in regard to speed, range and ability to carry load could be effected if higher wing loadings could be employed. It has, however, been impossible to employ hitherto very high wing loadings owing to the impracticability of taking off at the high minimum speeds involved. By means of this invention, however, an aircraft having a very high wing loading and a correspondingly high minimum flying speed can be safely launched. According to the invention the aircraft to be launched (having high wing loading and high minimum flying speed) is mounted on and above another aircraft of relatively low wing loading and minimum flying speed so as to form a composite aircraft of low or moderately low resultant wing loading and minimum flying speed. The composite aircraft thus formed (the two components being securely locked together) will have characteristics permitting of its being taken off at low or moderately low speed, so that neither exceptionally good conditions nor a long run will be required for taking off. In order to permit of efficient flight of the composite aircraft and safe detachment of the upper component (with high wing loading) from the lower component (with low wing loading) the invention includes means whereby the angle of incidence and/or lift coefficient of the wings of the upper component can be varied in relation to the lower component during flight of the composite aircraft and prior to the detachment of the upper component from the lower. This feature is of special importance for the following reasons. The minimum flying speed of the upper component will be considerably higher than the minimum flying speed of the composite aircraft, but the composite aircraft will be capable of reaching, either in level flight or as a result of diving, a maximum speed appreciably in excess of the minimum speed of the upper component. It is necessary that at the time when the upper component is detached from the lower component the angle of incidence and/or lift coefficient of the wings of the upper component shall be relatively large so as to ensure that the upper component will be air-borne and will tend to rise clear of the lower component. If, however, the upper component is initially set in relation to the lower component so that its wings will have a relatively large angle of incidence and/or lift coefficient when the composite aircraft reaches the speed at which detachment of the upper component from the lower is intended to take place, then during the take-off, climb and acceleration of the composite aircraft the angle of incidence of the wings of the upper component will be so large that the upper component will be in a stalled or nearly stalled condition. This will have the effect of seriously impairing the efficiency and controllability of the composite aircraft. If, on the other hand, the upper component is initially set in relation to the lower component so that its wings will have a relatively small angle of incidence and/or lift coefficient when the composite aircraft reaches the speed at which detachment of the upper component from the lower is intended to take place, then the upper component will not, while so set, have sufficient lift to enable it to rise from the lower component. According to my invention this fundamental difficulty is overcome by the incorporation of means for varying the angle of incidence and/or lift coefficient of the upper component during flight of the composite aircraft, whereby during the take-off and acceleration of the composite aircraft the upper component can be set so that its wings have the same or about the same angle of incidence as those of the lower component, but when it is desired to detach the upper component from the lower component the angle of incidence and/or lift coefficient of the wings of the upper component can be increased in relation to the lower component to the extent necessary to ensure that the upper component will become airborne and will tend to rise clear of the lower component. By virtue of this feature of my invention the upper component of the composite aircraft can be safely detached from the lower component at any desired time after the composite aircraft has reached a speed above the minimum flying speed of the upper component.

It will be understood that when the two portions of the composite aircraft are attached together, they form one complete aircraft which has good characteristics in regard to the total power and the total wing surface in relation to the total weight, and in regard to the positioning of the main planes and other portions of the composite aircraft so as to minimize interference and produce aerodynamic cleanness. In this way the composite aircraft as a whole will have good qualities in regard to its take-off both in the matter of length of run and in the matter of minimum speed at which it will become airborne. It will also have a considerable speed range so that after taking-off it may accelerate to a much greater speed than the speed at which it can take-off. Owing to the relatively small wing area of the upper component and the relatively high load which this upper component carries it will have a relatively high minimum speed, but when the composite aircraft has taken off it can accelerate until it has reached a speed higher than the minimum speed at which the upper component can maintain flight. At any time after this speed has been reached or exceeded, the upper component can continue to fly by itself and to accelerate still further if and when it is detached from the lower component. The invention provides means by which this detachment can be effected with safety to both components and I describe such means below.

It will be understood that during the process of taking-off and accelerating all the engines of both components may be running at full power, thus ensuring the best take-off and the quickest acceleration. It will also be understood that both components are fully equipped with pilots and such other crew as may be necessary for the safe navigation of the components as independent aircraft. Nevertheless the invention provides means by which either pilot, preferably the pilot of the lower component, can maintain full and undivided control of the composite aircraft so long as it is necessary or desirable that he should do so.

It will be understood that either of the components may be of monoplane or biplane construction, but the former type of construction is preferred because of the more convenient dimensions of the resulting composite aircraft. Either of the components may be of single or multi-engine type, the engines of both components being so arranged as to eliminate any risk of fouling of a propeller of one component by any portion of the other component after detachment has taken place.

The invention includes other special features to eliminate the risk of fouling of one component by the other, and these features are described below.

In overcoming the difficulties previously experienced in regard to the take-off of heavily loaded aircraft this invention enables a great increase to be made immediately in the ranges over which both commercial and military aircraft can be operated. It will be understood that a long range aircraft which is initially heavily loaded will be able to land safely at the end of its flight by virtue of the reduction of load due to consumption of fuel and oil during the flight. If for any reason it is necessary to land before completion of the long range flight the heavy load of fuel and oil can be discharged prior to such landing. Alternatively the invention permits of a great increase in the useful load carried, provided such load can be discharged or released prior to landing. In the case of military aircraft, for instance, a great increase in the load of bombs, torpedoes, etc., can be made. In the case of commercial aircraft additional load permitted by the invention can be released by parachute or other means prior to landing.

Another advantage of this invention is that it permits of the range of aircraft being very greatly increased without having recourse to the use of larger aircraft or power units. This feature enables long ranges to be accomplished or heavy useful loads to be carried without involving high initial cost of the aircraft employed, thus making long range air transport commercially feasible and considerably reducing the cost of long range or heavy load-carrying military aircraft.

Another advantage of this invention is its special applicability for the operation of aircraft from the decks of ships or under any conditions where only a short length of run is available. In such cases the composite aircraft can be designed to have a low minimum flying speed and a quick take-off, while the upper component can have a much higher minimum flying speed and carry a heavy useful load or have a long range. This feature will greatly increase the scope of flying operations from the decks of ships, and at the same time increase the safety of such operations.

The invention further applies to the case of aircraft launched by means of catapults or other special devices for quickly accelerating the aircraft to its minimum flying speed. A composite aircraft of the type described will be particularly suitable for launching by such means by virtue of its relatively low minimum speed.

This invention can also be applied to the attainment of much higher speeds than those possible with present day types of aircraft. It is well known that further progress in the development of high speed with aircraft following normal practice must be seriously restricted by the difficulty and danger of taking-off at very high speeds, and that maximum speeds could be considerably increased if a higher taking-off speed could be permitted. This difficulty is overcome by this invention, in one application of which the upper component may be a high speed aircraft of very high wing loading which would be impossible or extremely dangerous to take-off from either land or water. Alternatively, the upper component may be a high speed aircraft whose maximum speed is of the same order as that now attainable with existing types of aircraft, but with the important added advantage of being able to carry an appreciable useful load such as mails.

Another application of this invention is the provision of more than two detachable portions arranged according to the principles described above. In this case the portions may have successively increasing minimum speeds and in this way an even higher maximum speed may be obtained for the uppermost portion than that attainable where only two portions are employed.

It will be understood that one lower component can be employed for the successive despatch of any number of upper components. As soon as an upper component has been despatched, the lower component can land, and it is then available to have mounted upon it, by means of a crane, for example, another upper component. It can be ready for the despatch of this second upper component within a few minutes. The fact that one lower component can be used to despatch within a comparatively short time a large number of upper components, will greatly reduce the capital and operating costs of a fleet of aircraft, whether employed for military or commercial purposes.

It has been explained above that in order to ensure safe and effective detachment of the upper component from the lower component it is necessary that just prior to the moment of detachment the angle of incidence and/or lift coefficient of the wings of the upper component shall be increased, and provision is made in my invention for this to be effected. The upper component may conveniently be mounted on the lower component by means of a main mounting about which the upper component can pivot when free to do so and a secondary supporting member (e. g. a cradle, framework, post or wire) which initially holds the upper component at a fixed angle in relation to the lower component but is adjustable or removable so as to free the tail of the upper component for the purpose of enabling the pilot of that component to pivot it about the main mounting and so increase the angle of incidence of its wings (e. g. by operating his elevator control). The adjustable supporting member may be behind, in front of or below the main mounting or alternatively there may be more than one such adjustable supporting member. The adjustable supporting member or members may be such that the process of adjustment causes the attitude of the upper component to be varied, for instance the tail end of the upper component may be supported by an adjustable supporting member which is retractable into or towards the lower component and in the process of being so retracted alters the attitude of the upper component. Alternatively, other methods of increasing the lift coefficient of the wings of the upper component may be employed; for instance the section of the wings of the upper component, and/or the angular setting of its wings in relation to its hull or fuselage, may be varied to increase the lift coefficient to the desired extent.

According to a feature of the invention the upper component may be so mounted on the lower component that the resultant reaction between the two components acts at a suitable distance behind the centre of gravity of the lower component. If the upper component is so mounted on the lower component the effect of increasing the lift of the upper component will be equivalent to that of applying elevator control to the lower component to raise its tail and thus reduce the angle of incidence and lift coefficient of its wings. The total lift and air speed of the composite aircraft will thus automatically be kept substantially constant until detachment of the upper component from the lower component occurs.

According to a further feature of the invention the composite aircraft may be provided with locking means connecting the two components which remain engaged unless and until the angle of incidence and/or lift coefficient of the wings of the upper component is increased relatively to the lower component to a certain predetermined extent, but automatically disengage as and when that predetermined increase is made. Such automatic locking means may be applied not only to securing the upper component to the lower but also to preventing the upper component from rocking, swaying or otherwise moving in relation to the lower component, the locking means remaining effective until the moment when the upper component is about to be detached from the lower.

In addition to, or instead of said automatic locking means the two components of the composite aircraft may be connected together by locking means arranged to be released or locked by manual operation of a control or controls located in the upper and/or in the lower component. Such locking means may be arranged to return to the initial position on reversal or release of the control or controls. There may be also locking means to secure the two components together, which are initially inoperative but can be made operative by means of a control or controls in case of emergency, e. g. if it is decided to abandon the launching of the upper component after release of an attachment or attachments securing the two components together. Locking means securing the two components together or attaching an adjustable member or members to the upper component may be such that release can only be effected by the combined or consecutive operation of controls provided in each of the two components. It will be understood that such controls may be operated by the pilot or other member of the crew of the respective component.

Another feature of this invention is the provision of means by which the detachment of the upper component from the lower component automatically throttles down and/or switches off the engine or engines of the lower component, thus producing at the moment of release of the upper component a sudden and powerful retardation of the lower component. This will result in the separation of the two components being accelerated and the risk of fouling being reduced. The pilot of the lower component will be able to reopen the throttle or throttles or to switch on the engine or engines as soon as the upper component is safely clear of the lower component.

In order to accelerate further the separation of the two components the lower component may be provided with air brakes and/or a lift spoiling device either or both of which are automatically brought into action by the detachment of the upper component from the lower. The pilot of the lower component will be able to throw out of action such air brakes and/or wing lift spoiling device as soon as the upper component is safely clear of the lower component.

The invention includes the provision of guards to prevent risk of fouling between any parts of the two components due to relative lateral, rolling or directional movement immediately after detachment of the upper component from the lower component. The invention also includes the provision of stops or guards to prevent the upper component from pivoting longitudinally to too great an extent after release of the adjustable supporting member or members.

In order to provide against risks arising from divided control while the composite aircraft is flying as a single unit, the invention includes means for keeping one or more of the flying controls of the upper component locked until just prior to the detachment of that component from the lower component. The means for locking the flying control or controls of the upper component may be linked with the locking means by which the adjustable supporting member or members is or are initially attached to the upper component or with other locking means by which the upper component is secured to the lower component, so that the release of such locking means securing the two components together automatically frees the flying control or controls of the upper component. The pilot of the lower component can thus be assured of undivided control of the composite aircraft until the moment when he is ready for the upper component to be detached and operates his lock-releasing control to permit such detachment. It will be understood that a flying control or control of the upper component may be "locked" in any manner which deprives the pilot of that component of the use of such flying control or controls for instance the control surface or surfaces may be kept free or "floating" (in which case the action of unlocking will consist in re-connecting the surface or surfaces to the control mechanism), or a flying control or controls of the upper component may be linked up with the corresponding flying control or controls of the lower component in such manner as to provide the pilot of the lower component with an over-riding control (in which case the action of unlocking will consist in disconnecting the two control systems).

A further feature of the invention is the provision of an aerodynamically controlled safety device which renders it impossible for the upper component to be detached from the lower component until the composite aircraft has reached a predetermined air speed at which the upper component may be safely detached. This safety device may take the form of separate locking means securing the two components together or it may take the form of a safety lock preventing the release of other locking means securing the two components together.

The invention includes means for signalling between the two components comprising a telephone or electric circuit or mechanism signalling apparatus with connections which are easily broken or automatically broken when the upper component becomes detached from the lower.

The invention also includes means for transferring fuel and/or oil between the components comprising a feed pipe or pipes with connections which are easily broken or automatically broken when the upper component becomes detached from the lower.

The invention will now be described in further detail with reference to the accompanying drawings, in which Fig. 1 is a side elevation of the composite aircraft showing the two components locked together.

Figs 4 to 8 are detail views of various forms of mounting and locking mechanism for connecting together the two components of the composite aircraft.

Fig. 9 is a diagrammatic sketch showing a safety device for preventing release of the locking mechanism until the air speed of the composite aircraft reaches a predetermined limit.

Like reference numerals indicate like parts throughout the drawings.

Figure 1:
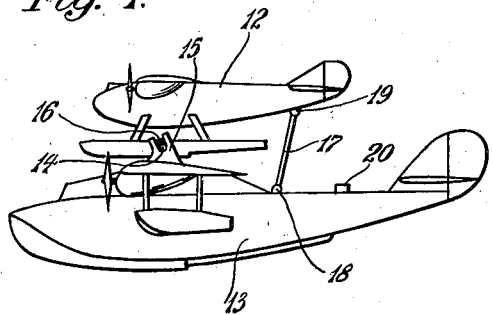
Figure 2:
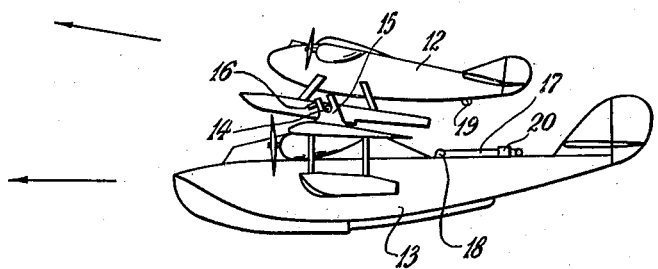
Fig. 2 is a corresponding side elevation showing the locking gear released and the upper component about to separate from the lower component.
Figure 3:
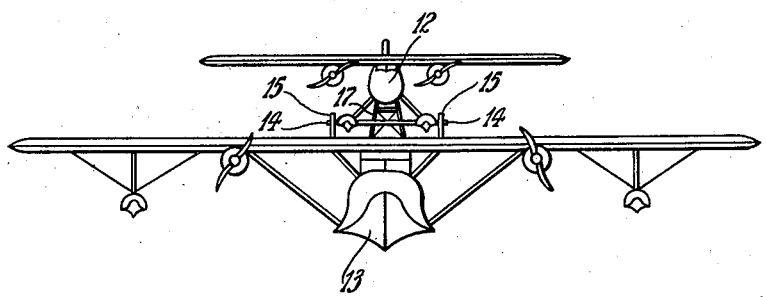
Fig. 3 is a front elevation of the composite aircraft in the configuration illustrated in Fig. 1.

In the construction illustrated in Figs. 1 to 3 the upper component 12 is supported on the lower component 13 by a main mounting comprising coaxial axles 14 projecting from opposite sides of the floats of the upper component which are received in coaxial sockets 15 mounted above the wings of the lower component. Locking pins 16 initially prevent escape of the axles from the sockets. In addition to the main mounting a rear supporting member 17 is provided for supporting the tail end of the upper component. The supporting member is pivoted at 18 to the lower component and detachably secured at 19 to the upper component. When detached from the upper component the member 17 turns about its pivot and is received in the receiving socket 20 on the lower component, as indicated in Fig. 2.

After release of the upper component from the supporting member 17 the tail of the upper component is lowered, for example by suitable operation of the elevator by the pilot of the upper component, in order to increase the angle of incidence of the wings of the upper component so as to ensure that the upper component will lift clear of the lower component when the locking pins 16 are withdrawn from the sockets. In the view shown in Fig. 2 the locking pins 16 have been withdrawn and the upper component is about to separate from the lower component.

As shown in Figs. 1 to 3 the main mounting permits of relative angular movement of the two components about a transverse axis, but the two components are initially restrained against such angular movement by the supporting member 17 which, however, is detachable at will to permit of such angular movement about the main mounting. It will be understood that instead of the two axles and sockets shown in Figs. 1 to 3 the main mounting may consist of one continuous axle forming part of the upper component which is received in sockets mounted above the wings of the lower component. Means (e. g. collars fixed on the axle or axles) are provided if necessary to prevent lateral movement of the upper component in relation to the lower component.

Means may be provided whereby the mounting or any part thereof associated with either component of the composite aircraft is retractable into or towards its appropriate component after separation of the two components, for the purpose of reducing drag or eliminating risk of fouling with the ground when the upper component lands or is beached after landing.

Fig. 4 is an enlarged view of an axle and socket of the kind illustrated in Figs. 1 to 3. It will be appreciated that the arrangement of the mounting may be reversed, the axle or axles being mounted on the lower component and the sockets forming part of the upper component.

This construction is shown in Fig. 5. In the various constructions illustrated in the drawings the socket 15 is shown as sloping in a forward direction. It will be understood, however, that in practice the attitude of the socket will be determined in relation to the aerodynamic characteristics of the composite aircraft and its two components. Thus, in certain cases it may be desirable for the socket to be vertical or even sloped backwardly instead of forwardly as shown in the drawings. It will also be understood that the depth of the socket will not necessarily be as shown in the drawings, but may if desired be either greater or less. For instance the socket may be so shallow as to offer little or no restriction to the direction of exit of the axle, provided the axle is suitably held in position in the socket, so as to permit of pivoting but not other movement, until the appropriate time for the release of the axle.

Fig. 8 is a detail view illustrating automatic release mechanism which initially holds the axle in the socket, but which, when the tail of the upper component has been lowered to a predetermined extent, automatically releases the axle from constraint so that it is free to leave the socket.

This automatic release mechanism comprises a hook 21 fixed to the axle 14 and co-operating with a projection 22 attached to the base of the socket 15. The engaging surface 24 of the hook, which co-operates with the projection 22 is cylindrical in shape, and coaxial with the axle 14. It will be seen that the reaction between the projection 22 and the locking hook 21 always opposes movement of the axle out of the socket. The length of the engaging surface 24 of the hook is such that when the tail of the upper component has been lowered to a predetermined extent the hook will be freed from the projection 22 so that the axle 14 will be free to move out of the socket 15.

There may be more than one such automatic releasing mechanism. There may, for example, be two coaxial sockets one on each side of the centre line of the upper component, and each provided with an automatic releasing mechanism of the type described. In this way means are provided for preventing lateral rocking of the upper component in relation to the lower, which remain effective until just prior to detachment of the upper component from the lower and are then automatically released. In addition there may be a third and centrally placed socket with automatic releasing mechanism, and in this case the two lateral locking hooks may be set to release somewhat before the central locking hook releases, so as to ensure against any restriction of the free detachment of the upper component due to one of the lateral locking hooks holding slightly longer than the other.

The method by which the locking hook 21 shown in Fig. 8 is brought into engagement with the restraining projection 22 is as follows:—

The upper component is first mounted on the lower component so that its axle or axles rest in the socket or sockets of the main mounting, but with its tail down. The tail is then raised until the secondary mounting or mountings 17 can be attached. During the process of raising the tail the locking hooks 21 will automatically engage with their respective restraining projections 22 and remain so engaged until the tail is again lowered in relation to the lower component.

It will be understood that the automatic releasing mechanism may take any of several forms following the general principle explained above. For instance the locking hook may be attached to a part of the upper component other than the axle, providing its engaging surface is cylindrical and coaxial with the axle. Again, the restraining projection attached to the lower component may be cylindrical in shape and coaxial with the axle when resting in the socket, and the locking hook may take the form of an arm with a transverse projection at its end which co-operates with the restraining projection. Alternatively, the mechanism may be reversed, that is to say, the locking hook may be attached to the lower component and the restraining projection to the upper component. In this case the restraining projection will be above the axle and will be arranged to move backwards over the locking hook as the tail of the upper component is lowered until disengagement takes place. The automatic releasing mechanism may take any other convenient form which provides for the upper component to be held to the lower component until the angle of incidence of the wings of the upper component is increased in relation to the lower component to a certain predetermined extent.

In the automatic releasing mechanism described the locking hook and/or restraining projection may be provided with means of adjustment (not shown) so as to ensure easy contact between them, take up any play due to wear, etc., and eliminate any tendency to bind during the downward movement of the tail of the upper component. For instance the projection 22 shown in Fig. 8 instead of being positively fixed to the base of the socket 15 may be adjustably attached so that its distance from the axle when resting in the socket can be adjusted (e. g. by means of a screw device), means being provided (e. g. a locking nut) to lock it in position after adjustment to the correct position.

In the automatic releasing mechanism described the locking hook and the restraining projection may take the form of a rack and pinion which engage together, the pinion being normally free to rotate on its bearing. The pinion may, however, be provided with braking means, which, when applied, will prevent relative movement between the locking hook and the restraining projection. Such braking means may be used as an emergency safeguard to hold the upper component due to any cause such as engine failure should fail to detach itself from the lower component due to any cause such as engine failure at the last moment. Alternatively such automatic releasing mechanism with braking means may be used instead of or in addition to an adjustable supporting member of the kind described above for holding the upper component in its initial position.

The hook may, if desired, be so constructed that it yields as the lift on the wings of the upper component increases, until, when a predetermined excess lift is reached, the hook gives way completely and ceases to prevent the axle from moving out of the socket. For instance, the engaging arm of the hook may be pivotally attached to the remainder of the hook and held in engagement with the restraining projection by means of a spring or other yielding means. It may be arranged that the outer portion only of the engaging arm of the hook is thus pivotally attached, the inner portion being rigid and providing, while it is in engagement with the restraining projection, a positive lock between the two components.

In automatic releasing mechanism of the type described it may be desirable, in order to obtain an ample extent of engagement between the locking hook and the restraining projection for a given variation in angular setting of the upper component on the lower, to employ a locking hook of such length that it will project below the hull, floats or undercarriage wheels of the upper component. In that case means of adjustment may be provided by which, after detachment of the upper component from the lower, the locking hook can be retracted, moved or adjusted so as to eliminate risk of fouling between it and the ground when the upper component lands or is beached after landing. Such means of adjustment may comprise the attachment of the locking hook to the upper component by means of a pin which can be withdrawn after detachment of the upper component from the lower component thus leaving the locking hook free to trail when the upper component lands or is beached after landing. Alternatively the locking hook may be mounted on a part of the upper component which can be rotated, retracted or otherwise moved after detachment of the upper component from the lower component so as to bring the locking hook into a positon in which it will be clear of the ground.

It will be understood that in addition to or instead of the automatic releasing mechanism described above, other positive locking means under manual control may be provided.

An example of such positive locking means is illustrated in Fig. 6 of the drawings. In this figure is shown a locking pin 16 which initially occupies the position illustrated in Fig. 6, in which it prevents escape of the axle 14 from the socket 15, but which on manipulation of a control may be withdrawn from its operative position by means of the cable 25 so as to free the axle 14. The locking pin 16 may be provided with a spring or other means to cause it to return to its operative position on reversal or release of the control. The positive means may take other forms, and may comprise a double lock which can only be released by the combined or consecutive operation of controls provided in both components. This double lock may consist of two independent locks one of which is controlled from each component or it may consist of a double-action lock which can only be released by the combined or consecutive operation of controls in both components. Positive locking means such as those shown in Fig. 6 may be arranged to be automatically released by means of suitable mechanism actuated by the lowering of the tail of the upper component in relation to the lower. Alternatively if means are provided for increasing the angle of incidence and/or lift coefficient of the wings of the upper component without altering the attitude of its hull or fuselage, such means may be linked with the positive locking means so that the latter will be automatically released as and when the desired angle of incidence and/or lift coefficient is reached.

It will be understood that if more than one positive lock or combination of locks is employed for securing the two components together the mechanism for releasing such locks or combinations of locks may be linked together.

Any one or more of the sockets may if desired be provided with restraining means to prevent the axle from moving out of the socket until such restraint is overcome by a certain predetermined lifting force applied to the axle. In this way the upper component may be restrained from leaving the lower component until there is an excess of lift ensuring that immediately after detachment the upper component will rise clear of the lower component.

An example of such restraining means is shown in Fig. 7 in which the axle 14 is restrained from moving out of the socket 15 by balls or rollers 26 which are housed in recesses in the sides of the socket and held in position by springs 27. The strength of these springs is such as to ensure that the axle will not move out of the socket until a force of the desired magnitude is applied to the axle. In this way the axle will be kept in the socket until the upper component has sufficient lift to ensure its rapid separation from the lower component immediately after detachment. The restraining means may take other forms; for instance, the balls or rollers may be replaced by a spring or springs which must be pressed by the axle into a recess or recesses in the socket before the axle can get out.

Figure 14:
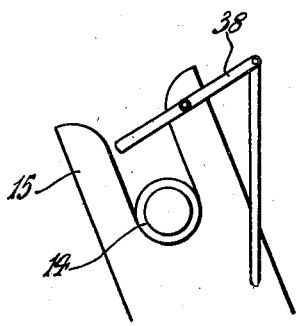
Fig. 14 is a detail view showing means by which the engine or engines of the lower component is or are automatically throttled down and/or switched off as the upper component becomes detached from the lower component.

Fig. 14 shows an example of means by which the engine or engines of the lower component are automatically throttled down and/or switched off as the upper component becomes detached from the lower component. The trip lever 38 is actuated by the axle 14 as it moves out of the socket 15. The trip lever is connected by means of rods, wires, etc., to the throttle controls and/or to the master switch control of the engine or engines of the lower component in such manner that the actuation of the trip lever by the axle as it moves out of the socket causes the engine or engines of the lower component to be throttled down and/or switched off. This arrangement will ensure that the engine or engines of the lower component are only thus automatically throttled down and/or switched off when the upper component has become separately air-borne and has actually become detached from the lower component. The device will not restrict the pilot of the lower component from reopening the throttle or throttles and/or switching on the engine or engines as soon as the upper component is safely clear of the lower component. It will be understood that the automatic throttling down and/or switching off of the engine or engines of the lower component may be achieved by other means such as the breaking of an electric circuit by the axle as it leaves the socket.

Means similar to those described for the automatic throttling down and/or switching off of the engine or engines of the lower component may be employed for automatically bringing into play air brakes and/or a lift spoiling device on the lower component, or the same means may be employed for the actuation of any or all of these devices for accelerating the separation of the two components.

Guards to prevent lateral, rolling or directional movement of the upper component in relation to the lower component immediately after detachment may take the form of guides or posts erected on the top plane hull or fuselage of the lower component. Such guards will only be required where there might otherwise be risk of fouling between parts of the two components, and are not shown in the particular cases illustrated.

Guards to prevent undue longitudinal tilting of the upper component after detachment of the adjustable supporting member or members may take the form of stops placed on the top plane, hull or fuselage of the lower component beneath the hull, fuselage, floats, undercarriage or wheels of the upper component to limit pivoting of the upper component about its main mounting.

Figure 12:
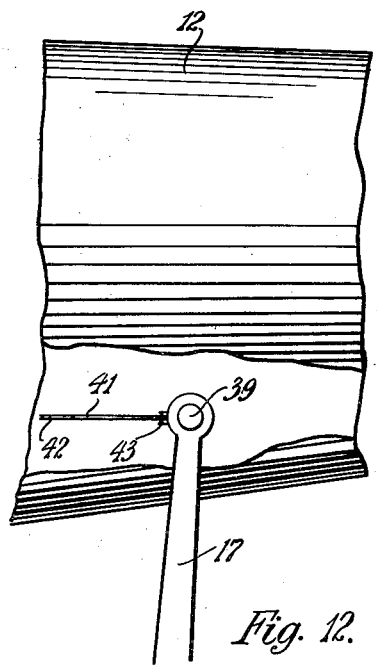
Figs. 12 and 13 are detailed views showing a form of attachment of the adjustable member supporting the tail end of the upper component of the composite aircraft, with locking and releasing mechanism.
Figure 13:
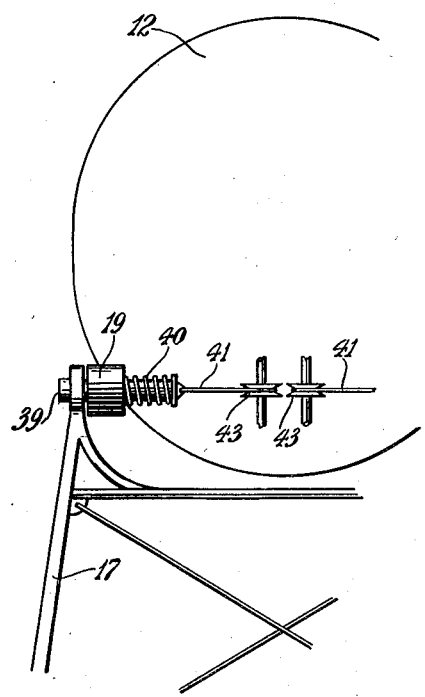

An example of the attachment of the adjustable supporting member to the tail end of the hull or fuselage of the upper component is shown in Figs. 12 and 13, in which the supporting member 17 is initially held to the lugs 19 by means of the bolts 39, which are kept in position by the springs 40. These bolts are connected by cables 41 passing round pulleys 43 to a common rod or cable 42 operable by the pilot or other member of the crew of the upper component by means of a control lever. Thus when the pilot or other member of the crew operates the lever to pull the common rod or cable 42 and the cables 41 the bolts 39 are withdrawn into the lugs 19 and the supporting member 17 is left free to pivot about its mounting on the lower component and swing clear of the upper component, which it immediately does owing to the air forces acting on it.

In the example shown in Figs. 12 and 13 the release of the adjustable supporting member is controlled solely from the upper component, but an additional locking device controlled from the lower component may be provided. For instance a locking pin or pins may be provided initially preventing withdrawal of one or both of the bolts 39. The locking pin or pins may be connected (for instance by Bowden cable) to a control lever in the lower component, the operation of which by the pilot or other member of the crew of the lower component will cause the locking pin or pins to be withdrawn from the bolt or bolts thus leaving the pilot or other member of the crew of the upper component free to release the adjustable supporting member. In this way the pilot of the lower component is provided with an over-riding control preventing detachment of the upper component until he is ready for such detachment to take place.

The additional locking device under the control of the pilot or other member of the crew the lower component may take the form of a lock or locks arranged to return to the locking position when the control lever is returned to its initial position, thus ensuring that the adjustable supporting member can only be released at a time when the pilots of both components are satisfied that the conditions are favourable for detachment of the upper component from the lower.

The mechanism for releasing the attachment of the adjustable supporting member may be linked with mechanism for releasing any other positive lock or locks which may be employed for securing the upper component to the lower component.

The means for locking a flying control or controls of the upper component referred to above may conveniently be linked with the mechanism for releasing the attachment of the adjustable supporting member. It may, for instance, be arranged that the lever by which the pilot or other member of the crew of the upper component releases the attachment of the adjustable supporting member also releases the means for locking the flying control or controls of the upper component. If, as proposed above, the release of the attachment of the adjustable supporting member is made dependent on the release of an over-riding locking device operated from the lower component, the pilot of the lower component will thus be assured of undivided control of the composite aircraft until the moment when he is ready for the detachment of the upper component to take place and releases said over-riding locking device. On the other hand the pilot of the upper component will be able to assume individual control of that component from the moment when the adjustable supporting member is released.

The means for locking a flying control or controls of the upper component may, however, be actuated independently or may be linked with other positive locking means securing the upper component to the lower component or with automatic release mechanism actuated by the lowering of the tail of the upper component or by mechanism for otherwise increasing the angle of incidence and/or lift coefficient of the wings of the upper component in relation to the lower component. Alternatively it may be arranged that the means for locking the elevator control of the upper component are linked with the mechanism for releasing the attachment of the adjustable supporting member, while the means for locking the rudder and/or aileron controls of the upper component are linked with other positive locking means securing the upper component to the lower component, or with automatic release mechanism actuated by the lowering of the tail of the upper component or by mechanism for otherwise increasing the angle of incidence and/or lift coefficient of the wings of the upper component in relation to the lower component.

Figure 10:
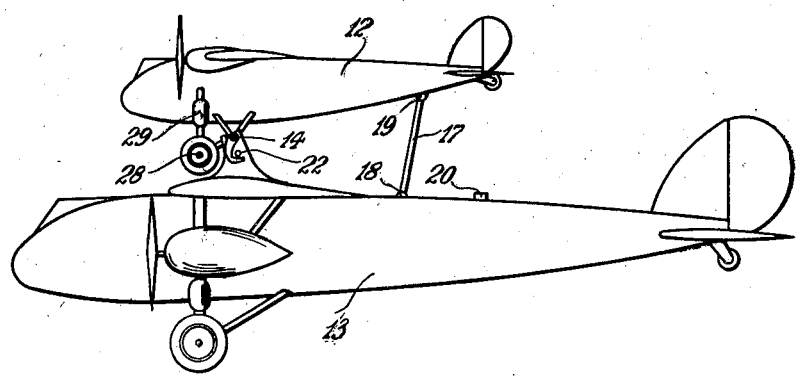
Figs. 10 and 11 are views similar to those in Figs. 1 and 2, but differ in that they illustrate a composite aircraft whose components are of land type instead of marine type.
Figure 11:
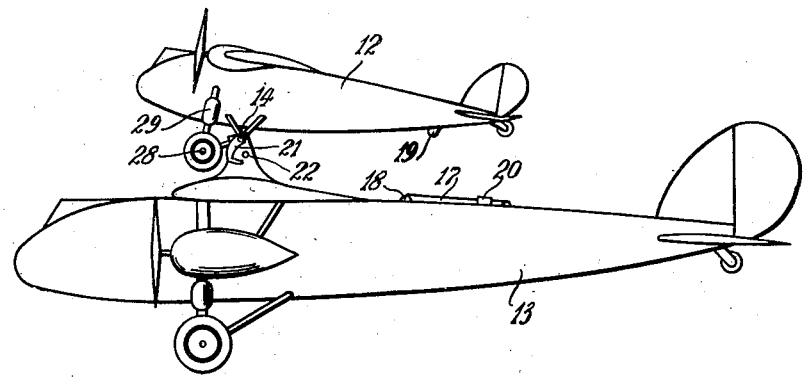

Figs. 10 and 11 show a composite aircraft of the type described, in which both components are land type aircraft. The general method of mounting the upper component on the lower is similar to that shown in Figs. 1, 2 and 3, the tail end of the fuselage being similarly supported by an adjustable member 17 which may be released so as to free the tail and enable the pilot of the upper component to increase the angle of incidence of its wings. As shown in Fig. 11 the angle of incidence of the wings of the upper component has been increased to a sufficient extent to permit of the safe detachment of the upper component from the lower component and at the same time the locking hook 21 has moved into a position in which it is no longer restrained by the projection 22.

In the case of an upper component of land type the axle or axles of the undercarriage may be employed as the axle or axles of the main mounting, or alternatively an additional axle or axles may be provided. In the construction illustrated in Figs. 10 and 11 it will be noted that the axle 14 which is received in the sockets on the lower component is additional to the axles 28 of the undercarriage. This arrangement has the advantages that the axle 14 is in rigid relationship to the fuselage of the upper component, and that this axle can be placed approximately below the centre of gravity of the upper component. If on the other hand the axles of the undercarriage were to be employed as axles of the main mounting the connections between the two components would be of an elastic nature, due to the presence of the shock absorbing strut 29. Such elastic connection would be undesirable as it would permit of relative vertical and rocking movement between the two components of the composite aircraft before the proper time for detachment of the upper component from the lower component.

If, however, it is desired to employ the axle or axles of the undercarriage as the axle or axles of the main mounting means (not shown in the drawings) may be provided whereby the springs or shock absorbers of the undercarriage of the upper component are prevented from functioning until after the detachment of the upper component from the lower, such means comprising locks or stops which are released either automatically when the upper component becomes detached from the lower, or by a subsequent action of the pilot or other member of the crew of the upper component.

Fig. 9 illustrates an aerodynamically operated safety device which renders it impossible for the upper component to be detached from the lower component until the composite aircraft has reached a predetermined air speed at which the upper component may be safely detached. This safety device comprises a vane 30 pivoted at 31 to one or other of the components of the composite aircraft. A locking pin 33 passing through a hole in the sleeve 34 and the rod 35 initially locks the rod so that it is incapable of movement in the sleeve. The rod 35 forms part of the manually operated mechanism for releasing one or more of the locking devices securing the two components together, e. g. the attachment of the adjustable supporting member to the upper component. It will be appreciated therefore that so long as the pin 33 remains in the sleeve 34 it will be impossible for the connections between the two components of the composite aircraft to be released. The pin 33 is normally held in its operative position by the spring 36. The pin 33 is connected to the vane 30 by means of the cable 32 which passes around a pulley 37.

When the air speed of the composite aircraft exceeds a predetermined limit, the air pressure (in the direction of the arrow) on the vane 30 causes the latter to turn about its pivot 31 and disengage the pin 33 from the rod 35 against the action of the spring 36, thus freeing the control for releasing the locking device or devices.

The aerodynamically operated safety device may be arranged to re-engage and re-lock the releasing control if and whenever the air-speed of the composite aircraft falls below the predetermined limit before the releasing control has been operated. Thus in the example shown in Fig. 9 if the air-speed falls below the predetermined limit the spring 36 will cause the pin 33 to return to its operative position, provided the rod 35 has not been operated or has been returned to its initial position.

The aerodynamically operated safety device may take other forms and may employ mechanical, electrical or other means in its functioning. For instance instead of being actuated by a vane it may be actuated by an airscrew or windmill the speed of rotation of which will depend on the air-speed of the composite aircraft. When the predetermined air-speed is reached the airscrew or windmill will rotate at sufficient speed to release the locking pin by means of suitable centrifugal, electrical, hydraulic or pneumatic mechanism.

It will be understood that the aerodynamically operated safety device may be applied to control directly a positive lock or locks securing the two components together. For instance, the locking pin 33 (Fig. 9) or its equivalent may perform a similar function to that of the locking pin (Fig. 6), that is to say it may directly prevent detachment of the upper component from the lower component. It will also be understood that one such aerodynamically operated safety device may control more than one such locking pin or its equivalent. It will also be understood that each stage in the release of the connections between the two components may be so controlled and that more than one such aerodynamically operated safety device may be employed if desired.

It will be understood that any of the locking, releasing or safety devices included in the invention may be actuated as described or if desired by electrical hydraulic or pneumatic means.

What I claim as my invention and desire to secure by Letters Patent is:—

1. A composite aircraft comprising two component aircraft each capable of separate flight mounted one on top of the other with the upper component initially so set in relation to the lower component that during the take-off and flight of the composite aircraft the wings of both components contribute in an efficient manner towards the total lift required for such take-off and flight, rigid but releasable locking means initially connecting the components together so as to enable the composite aircraft to take-off, fly and land as a single unit, and means for increasing the lift coefficient of the wings of the upper component relatively to that of the wings of the lower component during flight of the composite aircraft as such, and while the two components are still attached together.

2. A composite aircraft comprising two component aircraft each capable of separate flight mounted one on top of the other with the upper component initially so set in relation to the lower component that during the take-off and flight of the composite aircraft the wings of both components contribute in an efficient manner towards the total lift required for such take-off and flight, rigid but releasable locking means initially connecting the components together so as to enable the composite aircraft to take-off, fly and land as a single unit, means for increasing the lift coefficient of the wings of the upper component relatively to that of the wings of the lower component during flight of the composite aircraft, and means for preventing detachment of the upper component from the lower component until after the lift coefficient of the wings of the upper component has been increased relatively to that of the wings of the lower component to a predetermined extent sufficient to ensure safe separation of the two components.

3. A composite aircraft comprising two component aircraft each capable of separate flight mounted one on top of the other with the upper component initially so set in relation to the lower component that during the take-off and flight of the composite aircraft the wings of both components contribute in an efficient manner towards the total lift required for such take-off and flight, rigid but releasable locking means initially connecting the components together so as to enable the composite aircraft to take-off, fly and land as a single unit, means for increasing the lift coefficient of the wings of the upper component relatively to that of the wings of the lower component during flight of the composite aircraft, and means for preventing detachment of the upper component from the lower component arranged to be released automatically when the lift coefficient of the wings of the upper component is increased relatively to that of the wings of the lower component to a predetermined extent.

4. A composite aircraft comprising two component aircraft each capable of separate flight mounted one on top of the other with the upper component initially so set in relation to the lower component that during the take-off and flight of the composite aircraft the wings of both components contribute in an efficient manner towards the total lift required for such take-off and flight, rigid but releasable locking means initially connecting the components together so as to enable the composite aircraft to take-off, fly and land as a single unit, means for increasing the lift coefficient of the wings of the upper component relatively to that of the wings of the lower component during flight of the composite aircraft, and mechanism for automatically releasing the upper component from attachment to the lower component when the lift coefficient of the wings of the upper component is increased relatively to that of the wings of the lower component to a predetermined extent.

5. A composite aircraft comprising two component aircraft each capable of separate flight mounted one on top of the other with the upper component initially so set in relation to the lower component that during the take-off and flight of the composite aircraft the wings of both components contribute in an efficient manner towards the total lift required for such take-off and flight and with the resultantant reaction between the two components acting behind the centre of gravity of the lower component, rigid but releasable locking means initially connecting the components together so as to enable the composite aircraft to take-off, fly and land as a single unit, and means for increasing the lift coefficient of the wings of the upper component relatively to that of the wings of the lower component during flight of the composite aircraft to an extent sufficient to ensure safe separation of the two components when the locking means are fully released.

6. A composite aircraft comprising an upper component aircraft of relatively high wing loading and a lower component aircraft of relatively low wing loading each capable of separate flight and mounted one on top of the other with the upper component initially so set in relation to the lower component that during the take-off and flight of the composite aircraft the wings of both components contribute in an efficient manner towards the total lift required for such take-off and flight, rigid but releasable locking means initially connecting the components together so as to enable the composite aircraft to take-off, fly and land as a single unit, and means for increasing the lift coefficient of the wings of the upper component relatively to that of the wings of the lower component during flight of the composite aircraft to an extent sufficient to ensure safe separation of the two components when the locking means are fully released.

7. A composite aircraft comprising two component aircraft each capable of separate flight, a main mounting connecting together the two components permitting of relative angular movement of the two components about a transverse axis but comprising locking means attaching the two components together, constraining means initially preventing such relative angular movement and holding the two components rigidly together, with the wings of both components contributing in an efficient manner towards the total lift required for the take-off and flight of the composite aircraft as a single unit, but releasable during flight of the composite aircraft to permit of relative angular movement of the two components about the transverse axis, and means for releasing the locking means attaching the two components together after the lift coefficient of the wings of the upper component has been increased relatively to that of the wings of the lower component by such relative angular movement to an extent sufficient to ensure safe separation of the two components.

8. A composite aircraft comprising two component aircraft each capable of separate flight, a main mounting connecting together the two components permitting of relative angular movement of the two components about a transverse axis but comprising locking means attaching the two components together, constraining means initially preventing such relative angular movement and holding the two components rigidly together, with the wings of both components contributing in an efficient manner towards the total lift required for the take-off and flight of the composite aircraft as a single unit, but adjustable during flight of the composite aircraft to cause relative angular movement of the two components, and means for releasing the locking means attaching the two components together after the lift coefficient of the wings of the upper component has been increased relatively to that of the wings of the lower component by such relative angular movement to an extent sufficient to ensure safe separation of the two components.

9. A composite aircraft comprising two component aircraft each capable of separate flight, a main mounting of the pin and socket type connecting together the two components which permits of relative angular movement of the two components about a transverse axis, the pins being associated with one component and the sockets with the other, locking means initially preventing the pins from leaving the sockets, constraining means initially preventing relative angular movement about the transverse axis and holding the two components rigidly together, with the wings of both components contributing in an efficient manner towards the total lift required for the take-off and flight of the composite aircraft as a single unit, but releasable during flight of the composite aircraft to enable relative angular movement of the two components about the transverse axis to be effected, and means for releasing the locking means initially preventing the pins from leaving the sockets after the lift coefficient of the wings of the upper component has been increased relatively to that of the wings of the lower component by such relative angular movement to an extent sufficient to ensure safe separation of the two components.

10. A composite aircraft comprising two component aircraft each capable of separate flight mounted one on top of the other with the upper component initially so set in relation to the lower component that during the take-off and flight of the composite aircraft the wings of both components contribute in an efficient manner towards the total lift required for such take-off and flight, a main mounting of the pin and socket type connecting together the two components, the pins being associated with one component and the sockets with the other, yielding means preventing the pins from leaving the sockets until a predetermined excess lift acts on the wings of the upper component, and means for increasing the lift coefficient of the wings of the upper component relatively to that of the wings of the lower component during flight of the composite aircraft to the extent necessary to cause the predetermined excess lift to act on the wings of the upper component and thereby to overcome the resistance of the yielding means preventing the pins from leaving the sockets.

11. A composite aircraft comprising two component aircraft each capable of separate flight mounted one on top of the other with the upper component initially so set in relation to the lower component that during the take-off and flight of the composite aircraft the wings of both components contribute in an efficient manner towards the total lift required for such take-off and flight, means for increasing the lift coefficient of the wings of the upper component relatively to that of the wings of the lower component during flight of the composite aircraft, and locking means initially connecting the components together so as to enable the composite aircraft to take-off, fly and land as a single unit, comprising at least one locking device consisting of a hook associated with one component engaging with a restraining projection associated with the other component, the surfaces of engagement of which are arranged to permit of the passage of the hook over the restraining projection as the lift coefficient of the wings of the upper component is increased relatively to that of the wings of the lower component until disengagement occurs automatically when a predetermined relative increase in the lift coefficient of the wings of the upper component has been made.

12. A composite aircraft comprising two component aircraft each capable of separate flight, a main mounting connecting together the two components permitting of relative angular movement of the two components about a transverse axis, constraining means initially preventing relative angular movement of the two components and holding the two components rigidly together, with the wings of both components contributing in an efficient manner towards the total lift required for the take-off and flight of the composite aircraft as a single unit, but releasable during flight of the composite aircraft to enable relative angular movement of the two components about the transverse axis to be effected, and locking means comprising at least one locking device consisting of a hook associated with one component engaging with a restraining projection associated with the other component, the surfaces of engagement of which are arranged to permit of the passage of the hook over the restraining projection as relative angular movement of the two components takes place, until disengagement occurs automatically when a predetermined relative increase in the angle of incidence of the wings of the upper component has been made.

13. A composite aircraft comprising two component aircraft each capable of separate flight mounted one on top of the other with the upper component initially so set in relation to the lower component that during the take-off and flight of the composite aircraft the wings of both components contribute in an efficient manner towards the total lift required for such take-off and flight, means for increasing the lift coefficient of the wings of the upper component relatively to that of the wings of the lower component during flight of the composite aircraft, and locking means initially connecting the components together so as to enable the composite aircraft to take-off, fly and land as a single unit, comprising at least one locking device consisting of a hook associated with one component engaging with a restraining projection associated with the other component, the hook being arranged to yield as the lifting force on the upper component is increased and to give way completely when a predetermined excess lift is reached.

14. A composite aircraft comprising two component aircraft each capable of separate flight mounted one on top of the other with the upper component initially so set in relation to the lower component that during the take-off and flight of the composite aircraft the wings of both components contribute in an efficient manner towards the total lift required for such take-off and flight, means for increasing the lift coefficient of the wings of the upper component relatively to that of the wings of the lower component during flight of the composite aircraft, and locking means initially connecting the components together so as to enable the composite aircraft to take-off, fly and land as a single unit, comprising at least one locking device consisting of a hook associated with one component engaging with a restraining projection associated with the other component, the surfaces of engagement of which are formed respectively as a rack and pinion and are arranged to permit of the passage of the hook over the restraining projection as the lift coefficient of the wings of the upper component is increased relatively to that of the wings of the lower component until disengagement occurs automatically when a predetermined relative increase in the lift coefficient of the wings of the upper component has been made.

15. A composite aircraft comprising two component aircraft each capable of separate flight mounted one on top of the other with the upper component initially so set in relation to the lower component that during the take-off and flight of the composite aircraft the wings of both components contribute in an efficient manner towards the total lift required for such take-off and flight, means for increasing the lift coefficient of the wings of the upper component relatively to that of the wings of the lower component during flight of the composite aircraft, locking means initially connecting the components together so as to enable the composite aircraft to take-off, fly and land as a single unit, comprising at least one locking device consisting of a hook associated with one component engaging with a restraining projection associated with the other component, the surfaces of engagement of which are arranged to permit of the passage of the hook over the restraining projection as the lift coefficient of the wings of the upper component is increased relatively to that of the wings of the lower component until disengagement occurs automatically when a predetermined relative increase in the lift coefficient of the wings of the upper component has been made, and adjusting means to ensure contact between the hook and the restraining projection and easy passage of the one over the other.

16. A composite aircraft comprising two component aircraft each capable of separate flight mounted one on top of the other with the upper component initially so set in relation to the lower component that during the take-off and flight of the composite aircraft the wings of both components contribute in an efficient manner towards the total lift required for such take-off and flight, means for increasing the lift coefficient of the wings of the upper component relatively to that of the wings of the lower component during flight of the composite aircraft, locking means initially connecting the components together so as to enable the composite aircraft to take-off, fly and land as a single unit, comprising at least one locking device consisting of a hook associated with one component engaging with a restraining projection associated with the other component, the surfaces of engagement of which are formed respectively as a rack and pinion and are arranged to permit of the passage of the hook over the restraining projection as the lift coefficient of the wings of the upper component is increased relatively to that of the wings of the lower component until disengagement occurs automatically when a predetermined relative increase in the lift coefficient of the wings of the upper component has been made, a brake for preventing rotation of the pinion forming the restraining projection, and means for actuating said brake during flight of the composite aircraft.

17. A composite aircraft comprising two component aircraft each capable of separate flight mounted one on top of the other with the upper component initially so set in relation to the lower component that during the take-off and flight of the composite aircraft the wings of both components contribute in an efficient manner towards the total lift required for such take-off and flight, means for increasing the lift coefficient of the wings of the upper component relatively to that of the wings of the lower component during flight of the composite aircraft, locking means initially connecting the components together so as to enable the composite aircraft to take-off, fly and land as a single unit, comprising at least one locking device consisting of a hook associated with one component engaging with a restraining projection associated with the other component, the surfaces of engagement of which are arranged to permit of the passage of the hook over the restraining projection as the lift coefficient of the wings of the upper component is increased relatively to that of the wings of the lower component until disengagement occurs automatically when a predetermined relative increase in the lift coefficient of the wings of the upper component has been made, and means for retracting the hook into its associated component after separation of the two components.

18. A composite aircraft comprising two component aircraft each capable of separate flight mounted one on top of the other with the upper component initially so set in relation to the lower component that during the take-off and flight of the composite aircraft the wings of both components contribute in an efficient manner towards the total lift required for such take-off and flight, means for increasing the lift coefficient of the wings of the upper component relatively to that of the wings of the lower component during flight of the composite aircraft, locking means initially connecting the components together so as to enable the composite aircraft to take-off, fly and land as a single unit, comprising at least one locking device consisting of a hook associated with one component engaging with a restraining projection associated with the other component, the surfaces of engagement of which are arranged to permit of the passage of the hook over the restraining projection as the lift coefficient of the wings of the upper component is increased relatively to that of the wings of the lower component until disengagement occurs automatically when a predetermined relative increase in the lift coefficient of the wings of the upper component has been made, a positive safety lock for preventing such automatic disengagement of the locking device, and means for actuating said safety lock during flight of the composite aircraft.

19. A composite aircraft comprising two component aircraft each capable of separate flight mounted one on top of the other with the upper component initially so set in relation to the lower component that during the take-off and flight of the composite aircraft the wings of both components contribute in an efficient manner towards the total lift required for such take-off and flight, means for increasing the lift coefficient of the wings of the upper component relatively to that of the wings of the lower component during flight of the composite aircraft, and locking means connecting the components together so as to enable the composite aircraft to take-off, fly and land as a single unit, comprising three locking devices, disposed one centrally and the others one on either side of the centre line of the composite aircraft, each of the three locking devices being arranged to be released automatically when the lift coefficient of the wings of the upper component is increased relatively to that of the wings of the lower component to a predetermined extent, but the side locking devices being arranged to be released somewhat sooner than the central locking device.

20. A composite aircraft according to claim 1 having at least one aerodynamically operated safety device initially preventing detachment of the upper component from the lower component but arranged to be actuated by air forces dependent on the air speed of the composite aircraft to permit of such detachment when the composite aircraft reaches a predetermined air speed.

21. A composite aircraft according to claim 1 having at least one aerodynamically operated safety device comprising a vane pivoted to one component of the composite aircraft and exposed to the airstream, yielding means arranged to oppose pivotal movement of the vane under the influence of the airstream, and locking means initially preventing detachment of the upper component from the lower component, but arranged to be actuated by movement of the vane about its pivot to permit of such detachment when the composite aircraft reaches a predetermined air speed.

22. A composite aircraft according to claim 1 having at least one aerodynamically operated safety device comprising a windmill exposed to the airstream and rotating under its influence, and locking means initially preventing detachment of the upper component from the lower component but arranged to be actuated by rotation of the windmill to permit of such detachment when the composite aircraft reaches a predetermined air speed.

23. A composite aircraft according to claim 1 having at least one aerodynamically operated safety device initially preventing detachment of the upper component from the lower component but arranged to be actuated by air forces dependent on the air speed of the composite aircraft to permit of such detachment when the composite aircraft reaches a predetermined air speed, and means for restoring the safety device to its initial operative condition if the air speed of the composite aircraft falls below the predetermined limit after actuation of the safety device to permit of detachment of the upper component from the lower component.

24. A composite aircraft comprising two component aircraft each capable of separate flight mounted one on top of the other with the upper component initially so set in relation to the lower component that during the take-off and flight of the composite aircraft the wings of both components contribute in an efficient manner towards the total lift required for such take-off and flight, rigid but releasable locking means initially connecting the components together so as to enable the composite aircraft to take-off, fly and land as a single unit, means for increasing the lift coefficient of the wings of the upper component relatively to that of the wings of the lower component during flight of the composite aircraft to an extent sufficient to ensure detachment of the upper component from the lower component when the locking means are fully released, and means for automatically increasing the rate of separation of the two components after such detachment.

25. A composite aircraft according to claim 24 wherein the means for increasing the rate of separation of the two components comprise a control for reducing the power output of the lower component, and mechanism for operating said control which is arranged to be actuated automatically on detachment of the upper component from the lower component.

26. A composite aircraft according to claim 24 wherein the means for increasing the rate of separation of the two components comprise an air brake associated with the lower component, and mechanism for making said air brake operative which is arranged to be actuated automatically on detachment of the upper component from the lower component.

27. A composite aircraft according to claim 24 wherein the means for increasing the rate of separation of the two components comprise a lift-spoiling device associated with the lower component, and mechanism for making said lift-spoiling device operative which is arranged to be actuated automatically on detachment of the upper component from the lower component.

28. A composite aircraft comprising two component aircraft each capable of separate flight mounted one on top of the other with the upper component initially so set in relation to the lower component that during the take-off and flight of the composite aircraft the wings of both components contribute in an efficient manner towards the total lift required for such take-off and flight, rigid but releasable locking means initially connecting the components together so as to enable the composite aircraft to take-off, fly and land as a single unit, means for increasing the lift coefficient of the wings of the upper component relatively to that of the wings of the lower component during flight of the composite aircraft as such, and while the two components are still attached together, and locking means for rendering inoperative at least one of the flying controls of the upper component arranged to be released by a control operated from the lower component.

29. A composite aircraft comprising two component aircraft each capable of separate flight mounted one on top of the other with the upper component initially so set in relation to the lower component that during the take-off and flight of the composite aircraft the wings of both components contribute in an efficient manner towards the total lift required for such take-off and flight, rigid but releasable locking means initially connecting the components together so as to enable the composite aircraft to take-off, fly and land as a single unit, means for increasing the lift coefficient of the wings of the upper component relatively to that of the wings of the lower component during flight of the composite aircraft as such, and while the two components are still attached together, and locking means for rendering inoperative at least one of the flying controls of the upper component arranged to be released automatically on release of locking means connecting the two components together.

30. A composite aircraft comprising two component aircraft each capable of separate flight mounted one on top of the other with the upper component initially so set in relation to the lower component that during the take-off and flight of the composite aircraft the wings of both components contribute in an efficient manner towards the total lift required for such take-off and flight, rigid but releasable locking means initially connecting the components together so as to enable the composite aircraft to take-off, fly and land as a single unit, means for increasing the lift coefficient of the wings of the upper component relatively to that of the wings of the lower component during flight of the composite aircraft as such, and while the two components are still attached together, and guards for restricting undesirable relative movement of the two components immediately after their separation.

31. A composite aircraft comprising two component aircraft each capable of separate flight, a main mounting connecting together the two components permitting of relative angular movement of the two components about a transverse axis but comprising locking means attaching the two components together, constraining means initially preventing such relative angular movement and holding the two components rigidly together, with the wings of both components contributing in an efficient manner towards the total lift required for the take-off and flight of the composite aircraft as a single unit, but releasable during flight of the composite aircraft to enable relative angular movement of the two components about the transverse axis to be effected, means for releasing the locking means attaching the two components together after the lift coefficient of the wings of the upper component has been increased relatively to that of the wings of the lower component by such relative angular movement to an extent sufficient to ensure safe separation of the two components, and guards for preventing undesirable relative angular movement of the two components after release of said constraining means.

32. A composite aircraft comprising two component aircraft each capable of separate flight mounted one on top of the other with the upper component initially so set in relation to the lower component that during the take-off and flight of the composite aircraft the wings of both components contribute in an efficient manner towards the total lift required for such take-off and flight, means for increasing the lift coefficient of the wings of the upper component relatively to that of the wings of the lower component during flight of the composite aircraft, rigid but releasable locking means initially connecting the components together so as to enable the composite aircraft to take-off, fly and land as a single unit, comprising manually operated releasing mechanism, and controls located in both components arranged to operate said releasing mechanism when both of said controls are actuated but not when only one of said controls is actuated.

33. A composite aircraft comprising two component aircraft each capable of separate flight mounted one on top of the other with the upper component initially so set in relation to the lower component that during the take-off and flight of the composite aircraft the wings of both components contribute in an efficient manner towards the total lift required for such take-off and flight, rigid but releasable locking means initially connecting the components together so as to enable the composite aircraft to take-off, fly and land as a single unit, means for increasing the lift coefficient of the wings of the upper component relatively to that of the wings of the lower component during flight of the composite aircraft as such, and while the two components are still attached together, locking mechanism for rendering inoperative at least one of the flying controls of the upper component, and controls located in both components arranged to release said locking mechanism when both of said controls are actuated but not when only one of said controls is actuated.

34. A composite aircraft according to claim 1 in which reactions between the two components are transmitted through shock absorbers forming part of the upper component, having locks for preventing said shock absorbers from functioning while the upper component is attached to the lower component, and means for releasing said locks automatically as the upper component becomes detached from the lower component.

35. A composite aircraft according to claim 1 in which reactions between the two components are transmitted through shock absorbers forming part of the upper component, having locks for preventing said shock absorbers from functioning while the upper component is attached to the lower component, and a control located in the upper component for releasing said locks.

36. A composite aircraft comprising two component aircraft each capable of separate flight, a main mounting connecting together the two components permitting of relative angular movement of the two components about a transverse axis but comprising locking means attaching the two components together, constraining means initially preventing such relative angular movement and holding the two components rigidly together, with the wings of both components contributing in an efficient manner towards the total lift required for the take-off and flight of the composite aircraft as a single unit, but releasable during flight of the composite aircraft to enable relative angular movement of the two components about the transverse axis to be effected, means for releasing the locking means attaching the two components together after the lift coefficient of the wings of the upper component has been increased relatively to that of the wings of the lower component by such relative angular movement to an extent sufficient to ensure safe separation of the two components, and means for retracting any part of said main mounting into its associated component after separation of the two components.

37. A composite aircraft comprising two component aircraft each capable of separate flight mounted one on top of the other with the upper component initially so set in relation to the lower component that during the take-off and flight of the composite aircraft the wings of both components contribute in an efficient manner towards the total lift required for such take-off and flight, rigid but releasable locking means initially connecting the components together so as to enable the composite aircraft to take-off, fly and land as a single unit, means for increasing the lift coefficient of the wings of the upper component relatively to that of the wings of the lower component during flight of the composite aircraft to an extent sufficient to ensure safe separation of the two components when the locking means are fully released, and means for retracting any part of said locking means into its associated component after separation of the two components.

ROBERT HOBART MAYO.